Dec. 17, 1940.  J. A. DELANEY  2,225,556
STOVEPIPE
Filed March 22, 1940
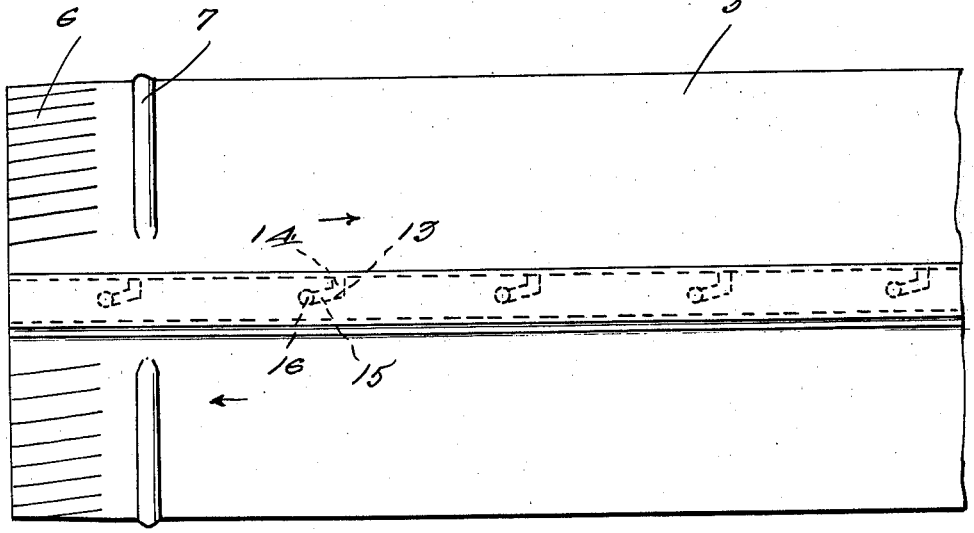
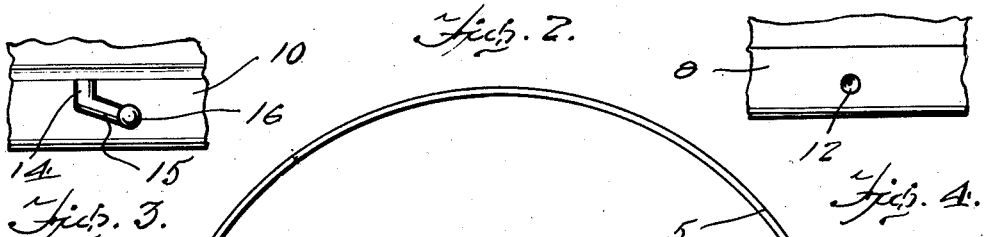
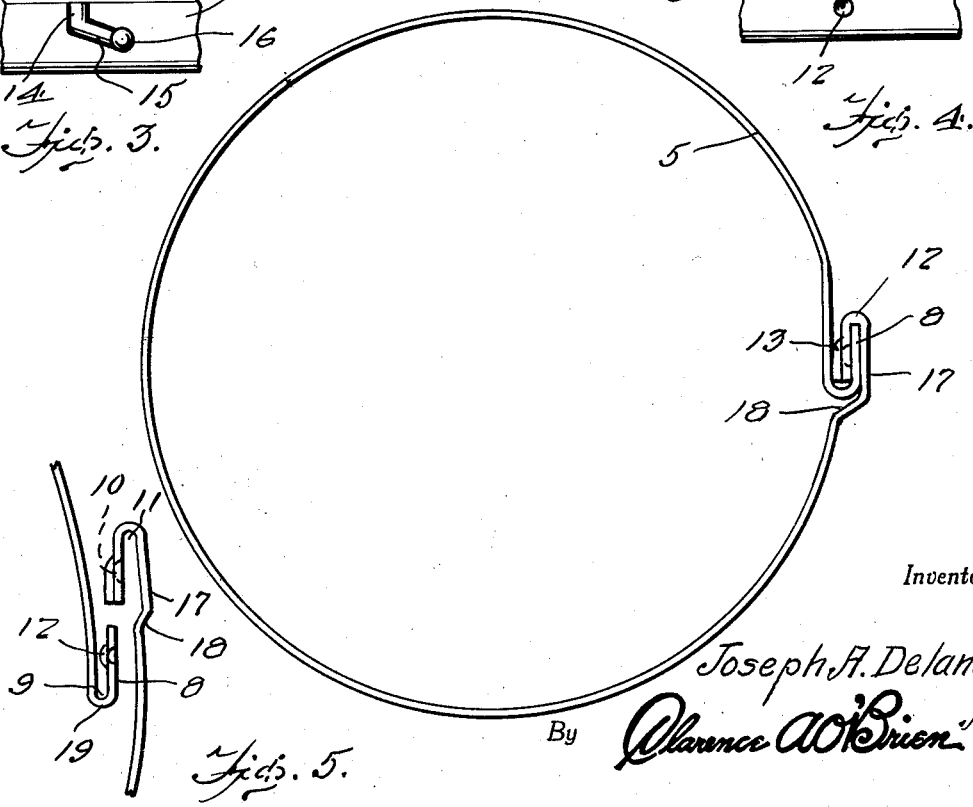
Inventor
Joseph A. Delaney
By Clarence A. O'Brien
Attorney Patented Dec. 17, 1940

2,225,556

UNITED STATES PATENT OFFICE 2,225,556

STOVEPIPE

Joseph A. Delaney, Jersey City, N. J.

Application March 22, 1940, Serial No. 325,460

1 Claim. (Cl. 138—74)

The present invention relates to new and useful improvements in stovepipes and similar sheet metal pipe and has for its primary object to provide a longitudinally split pipe and means for securing the edges of the pipe in closed position.

A further object of the invention is to provide an interlocking connection between the longitudinally split edges of the pipe to releasably secure the same in closed position against accidental separation.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a fragmentary side elevational view of a section of stovepipe embodying the present invention.

Figure 2 is an end elevational view.

Figure 3 is a fragmentary view of one edge of the pipe showing the guide grooves or slots forming one part of the interlocking connection.

Figure 4 is a similar view of the other edge of the pipe showing the other part of the interlocking connection, and Figure 5 is a fragmentary end elevational view showing the interlocking flanges in separated position.

Referring now to the drawing in detail, the numeral 5 designates a stovepipe of conventional construction which is usually constructed of relatively lightweight sheet metal and includes the slightly tapered corrugated end 6 inwardly of which is formed the abutting rib 7 for the adjacent end of a pipe when fitted thereon.

The pipe is split longitudinally, the split edges being constructed for overlapping, interlocking engagement, as shown in Figure 2 of the drawing, such interlocking construction comprising an outwardly bent flange 8 formed on one edge of the pipe and constructed by bending the longitudinal edge of the pipe in substantially closely spaced relation upon itself to provide a channel 9 and the other longitudinal edge of the pipe is bent inwardly to form a flange 10, likewise constructed by bending the edge of the pipe inwardly in substantially closely spaced relation upon itself to form the channel 11. The flange 10 is adapted for insertion in the channel 9, while the flange 8 is adapted for insertion in the channel 11.

In order to secure the parts against separation the inner surface of the flange 8 is formed with a plurality of knobs or protuberances 12, while the inner surface of the flange 10 is formed with a plurality of channels or bayonet slots 13, the slots extending inwardly from the edge portion of the flange 10, each of the slots, at their outer ends, extending at right angles to the edge of the flange as shown at 14 and communicating with a longitudinally extending inclined portion 15 and terminating in an enlarged recess or pocket 16, at the inner end of the slot.

The surface of the pipe, at its edge provided with the flange 10 is offset outwardly as shown at 17, to form a shoulder 18 on the inner surface of the pipe and which serves as an abutment for the rounded edge 19 formed by the flange 8, when the latter is inserted in the channel 11 whereby to obstruct withdrawal of the flange 8 from said channel.

When the edges of the pipe are in their normal position, as shown in Figure 1 of the drawing, the protuberances 12 and the recesses or pockets 16 are circumferentially aligned and accordingly, when connecting the spilt edges of the pipe the flange 8 is inserted into the channel 11 while the flange 10 is inserted into the channel 12, and the longitudinal free edges of the pipe are forced longitudinally in opposite directions in order that the protuberances 12 may be inserted into the outer end 14 of slots 13. Upon the return of the split edges of the pipe to their normal position the protuberances 12 will be guided along the inclined portion 15 into the pocket 16 and thus retain the parts against accidental separation.

It is believed the details of construction, manner of operation and advantages of the device will be readily apparent from the foregoing without further detailed explanation.

Having thus described the invention, what I claim is—

Fastening means for the edges of a longitudinally split pipe comprising a pair of interfitting flanges extending along opposite sides of said split and of hook shape in cross section for interfitting relation, one of said flanges being provided with bayonet grooves spaced lengthwise thereof and having open ends and closed ends, and the other flange being provided with internal knobs spaced along the same in correspondence to the spacing of said grooves and designed to be entered into said grooves by way of the open ends thereof and slid therein into the closed ends of the grooves, said closed ends terminating in pockets for accommodating said knobs, and said grooves having inner end sections extending obliquely lengthwise of said edges for coaction with said knobs to cam the flanges together.

JOSEPH A. DELANEY.